US012766744B2

(12) United States Patent

Uchijima et al.

(10) Patent No.: US 12,766,744 B2

(45) Date of Patent: Oct. 20, 2026

(54) ELECTRONIC DEVICE ASSEMBLY APPARATUS AND ELECTRONIC DEVICE ASSEMBLY METHOD

(71) Applicant: NACHI-FUJIKOSHI CORP., Tokyo (JP)

(72) Inventors: Daisaku Uchijima, Toyama (JP); Terumasa Sawato, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 237 days.

(21) Appl. No.: 18/424,744

(22) PCT Filed: Jun. 17, 2022

(86) PCT No.: PCT/JP2022/024320

§ 371 (c)(1),
(2) Date: Jan. 30, 2025

(87) PCT Pub. No.: WO2023/007980

PCT Pub. Date: Feb. 2, 2023

(65) Prior Publication Data

US 2025/0162175 A1 May 22, 2025

(30) Foreign Application Priority Data

Jul. 30, 2021 (JP) ................................ 2021-125234

(51) Int. Cl.
*B25J 15/06* (2006.01)

(52) U.S. Cl.
CPC ................................ *B25J 15/0616* (2013.01)

(58) Field of Classification Search
CPC .............. B25J 15/0616; B25J 15/0042; H01R 43/28; H01R 43/26; H01R 12/62
(Continued)

(56) References Cited

U.S. PATENT DOCUMENTS 10,804,670 B2 * 10/2020 Takano .................. B25J 9/1623
2018/0183200 A1 * 6/2018 Kobayashi ............. H01R 43/26
(Continued)

FOREIGN PATENT DOCUMENTS

CN 111971151 A 11/2020
JP H05289353 A * 11/1993
(Continued)

OTHER PUBLICATIONS

Search Report for PCT/JP2022/024310, Issued on Aug. 30, 2022, Total of 4 pages.
(Continued)

*Primary Examiner* — Ellis B. Ramirez
(74) *Attorney, Agent, or Firm* — Apex Juris, pllc; Tracy M Heims

(57) ABSTRACT

To provide an electronic device assembly apparatus and an electronic device assembly method for enabling to provide a reliable connection work for multiple types of cables having different widths while straightening a cable warp. An electronic device assembly apparatus includes a robot control device that controls a gripping device that grips a flexible flat cable and a robot arm that moves the gripping device relative to a circuit board. The gripping device includes: a suction device for sucking and holding a surface of the cable; and gripping claws for sandwiching and hold the cable. The gripping claws has first inclined surfaces formed on inner sides of the gripping claws in the width direction and second inclined surfaces formed at the bottoms of the gripping claws.

3 Claims, 8 Drawing Sheets

(58) Field of Classification Search
USPC ................. 700/245, 95; 294/213, 99.1, 106; 901/31; 29/762, 764, 750; 439/42
See application file for complete search history.

(56) References Cited

U.S. PATENT DOCUMENTS

| | | | | |
|---|---|---|---|---|
| 2018/0243907 | A1* | 8/2018 | Takeyama | B25J 15/103 |
| 2020/0254629 | A1* | 8/2020 | Matsuzaki | B25J 15/08 |

FOREIGN PATENT DOCUMENTS

| | | | | | |
|---|---|---|---|---|---|
| JP | 2015198696 | A | * | 11/2015 | |
| JP | 2018073721 | A | | 5/2018 | |
| JP | 2018103334 | A | | 7/2018 | |
| JP | 2019188534 | A | | 10/2019 | |
| JP | 2020151790 | A | | 9/2020 | |
| WO | WO-2016167325 | A1 | * | 10/2016 | G02B 6/36 |
| WO | 2017046975 | A1 | | 3/2017 | |
| WO | 2019049639 | A1 | | 3/2019 | |

OTHER PUBLICATIONS

Search Report for TW111120599, Issued on Sep. 28, 2022, Total of 2 pages.

* cited by examiner

ELECTRONIC DEVICE ASSEMBLY APPARATUS AND ELECTRONIC DEVICE ASSEMBLY METHOD

FIELD OF THE INVENTION

The present invention relates to an electronic device assembly apparatus and an electronic device assembly method for gripping a cable connected to a circuit board of an electronic device or the like.

An electronic device assembly apparatus is an apparatus used at a production site such as a plant, for example. The electronic device assembly apparatus performs connection work for connecting a leading end of a flat soft (flexible) cable such as an FPC (Flexible Printed Circuit) or an FFC (Flexible Flat Cable) to a connector (substrate-side connector) on a circuit board. The electronic device assembly apparatus includes a visual device such as a camera, a robot arm, and a controller that controls the visual device and the robot arm.

A cable is a soft elongated object having flexibility, and therefore, deforms in an unpredictable manner when it is bent or pressed. Accordingly, there is variation particularly in the position and posture of the leading end of the cable. It is difficult to recognize the leading end of the cable having such variation with use of the visual device of the electronic device assembly apparatus and to grip the leading end with use of the robot arm and insert the leading end into the substrate-side connector. Therefore, the connection work is performed manually in some cases. However, there is a problem that the work efficiency does not improve when accurate aligning between the leading end of the cable and the substrate-side connector is performed manually.

Moreover, a cable such as an FPC or an FFC may warp in such a manner that a central portion of the cable is raised relative to side edges of the cable. Therefore, the electronic device assembly apparatus is required to not only accurately grip the leading end of the cable but also correct warpage of the cable in the connection work for connecting the leading end of the cable to the substrate-side connector.

Patent Document 1 describes an electronic device assembly apparatus including a cable holding device that holds a cable and a controller that moves the cable holding device. The cable holding device includes a sandwiching device that conforms to the shape of the leading end of the cable. The controller moves the cable holding device along the cable and causes the sandwiching device to hold the leading end of the cable.

The sandwiching device included in the cable holding device includes an abutting surface that abuts against an upper surface of the cable and a pair of guides that sandwich the abutting surface and extend along the cable. Front portions of the pair of guides in the direction in which the cable holding device moves along the cable are provided with grooves into which side portions of the leading end of the cable enter.

In the electronic device assembly apparatus described in Patent Document 1, a reinforcing plate joined to the body of the cable deforms, and the side portions of the leading end of the cable enter the grooves in the pair of guides, and thus the cable is held by the sandwiching device. Patent Document 1 describes correcting warpage of the cable with this configuration to enable attachment of even a warped cable to a connector.

PRIOR ART DOCUMENT

Patent Document

Patent Document 1: Japanese Patent Application Laid-open No. 2020-151790

SUMMARY OF THE INVENTION

Problems to be Solved by the Invention

In an actual production process performed at the production site, multiple types of cables having different widths are sometimes connected (soldered) to a circuit board. Accordingly, the electronic device assembly apparatus is required to be capable of holding multiple types of cables having different widths and performing connection work by inserting leading ends of the cables into connectors on the circuit board.

However, in the technology described in Patent Document 1, the width between the pair of grooves formed in the pair of guides of the sandwiching device of the cable holding device is fixed. Therefore, with the technology described in Patent Document 1, it is possible to hold a cable that fits the fixed width, but it is not possible to hold multiple types of cables having different widths.

Also, in the technology described in Patent Document 1, special processing needs to be performed on the cable to taper the reinforcing plate of the cable so that the side portions of the leading end of the cable can enter the grooves in the pair of guides, and therefore, versatility of the technology is low.

Furthermore, bottoms of the pair of guides protrude below the pair of grooves. Therefore, when the cable is inserted into a connector in a state where the side portions of the leading end of the cable have entered the grooves in the pair of guides and are held by the sandwiching device, the bottoms of the pair of guides may interfere with the circuit board to which the cable is to be connected.

In view of the above problems, the present invention has an object of providing an electronic device assembly apparatus and an electronic device assembly method with which it is possible to reliably perform connection work for connecting multiple types of cables having different widths, and at the same time correct warpage of the cables.

Means to Solve the Problem

In order to solve the above problems, a representative configuration of an electronic device assembly apparatus according to the present invention includes: a gripping device that grips a flexible flat cable including a leading end that is a free end; a robot arm that moves the gripping device relative to a circuit board to which the leading end of the cable is to be connected; and a robot controller that controls operations of the gripping device and the robot arm, wherein the gripping device includes: a suction device that is provided in a lower surface of the gripping device and holds the cable by sucking a surface of the cable; and gripping claws that are located outward of the suction device in a width direction and hold the cable by sandwiching the cable in the width direction, first inclined surfaces are formed on inner sides of the gripping claws in the width direction, the first inclined surfaces being inclined in such a manner that a gripping width increases upward from bottoms of the gripping claws, and second inclined surfaces are formed at the bottoms of the gripping claws, the second inclined surfaces being inclined upward to the front in a state where the gripping claws are at horizontal positions.

With this configuration, it is possible to hold a cable by sucking a surface of the cable with use of the suction device provided in the lower surface of the gripping device. Furthermore, it is possible to hold the cable by sandwiching the cable in the width direction with use of the gripping claws located outward of the suction device in the width direction. Therefore, the gripping device can hold multiple types of cables having different widths.

Moreover, in the above configuration, the first inclined surfaces inclined in such a manner that the gripping width increases upward are formed on the inner sides of the gripping claws in the width direction. Therefore, when the cable is sandwiched by the gripping claws in the width direction, side edges of the cable deform while moving upward along the first inclined surfaces of the gripping claws in the state where the surface of the cable is pressed against the suction device. With this configuration, it is possible to hold the cable in a state where warpage of the cable is corrected.

Furthermore, in the above configuration, the second inclined surfaces inclined upward to the front in the state where the gripping claws are at horizontal positions are formed at the bottoms of the gripping claws. Therefore, by inclining the gripping device in such a manner that the bottoms of the gripping claws extend parallel to the circuit board, to which the cable is to be connected, in the state where the cable is held sandwiched by the gripping claws in the width direction, it is possible to avoid a situation in which the bottoms of the gripping claws interfere with the circuit board. Therefore, with this configuration, the connection work for connecting multiple types of cables having different widths can be reliably performed, and at the same time warpage of the cables can be corrected.

It is preferable that grooves in which side edges of the cable fit are formed on upper sides of the first inclined surfaces in the gripping device.

According to this configuration, in a case where a warped cable is sandwiched by the gripping claws in the width direction, side edges of the cable deform while moving upward along the first inclined surfaces of the gripping claws in the state where a surface of the cable is pressed against the suction device, and the side edges fit in the grooves on the upper sides of the first inclined surfaces. Therefore, the cable can be reliably held in a state where warpage of the cable is corrected.

In order to solve the above problems, a representative configuration of an electronic device assembly method according to the present invention is an electronic device assembly method for inserting a leading end of a flexible flat cable into a connector on a circuit board, the leading end being a free end, the method including: moving a gripping device that includes: a suction device that is provided in a lower surface of the gripping device and holds the cable by sucking a surface of the cable; and gripping claws that are located outward of the suction device in a width direction and hold the cable by sandwiching the cable in the width direction, wherein first inclined surfaces are formed on inner sides of the gripping claws in the width direction, the first inclined surfaces being inclined in such a manner that a gripping width increases upward from bottoms of the gripping claws, second inclined surfaces are formed at the bottoms of the gripping claws, the second inclined surfaces being inclined upward to the front in a state where the gripping claws are at horizontal positions, side edges of the cable are moved upward along the first inclined surfaces by sandwiching the cable in the width direction with use of the gripping claws while sucking the surface of the cable with use of the suction device to hold the cable, and the gripping device is inclined in such a manner that the bottoms of the gripping claws provided with the second inclined surfaces extend substantially parallel to the circuit board, and the gripping device is further moved to insert the leading end of the cable into the connector on the circuit board.

Constituent elements corresponding to the technical idea of the electronic device assembly apparatus described above and descriptions of those elements are also applicable to the method, and with this configuration, it is possible to reliably perform connection work for connecting multiple types of cables having different widths, and at the same time correct warpage of the cables.

Effects of the Invention

According to the present invention, it is possible to provide an electronic device assembly apparatus and an electronic device assembly method with which it is possible to reliably perform connection work for connecting multiple types of cables having different widths, and at the same time correct warpage of the cables.

EMBODIMENTS OF THE INVENTION

Figure 1:
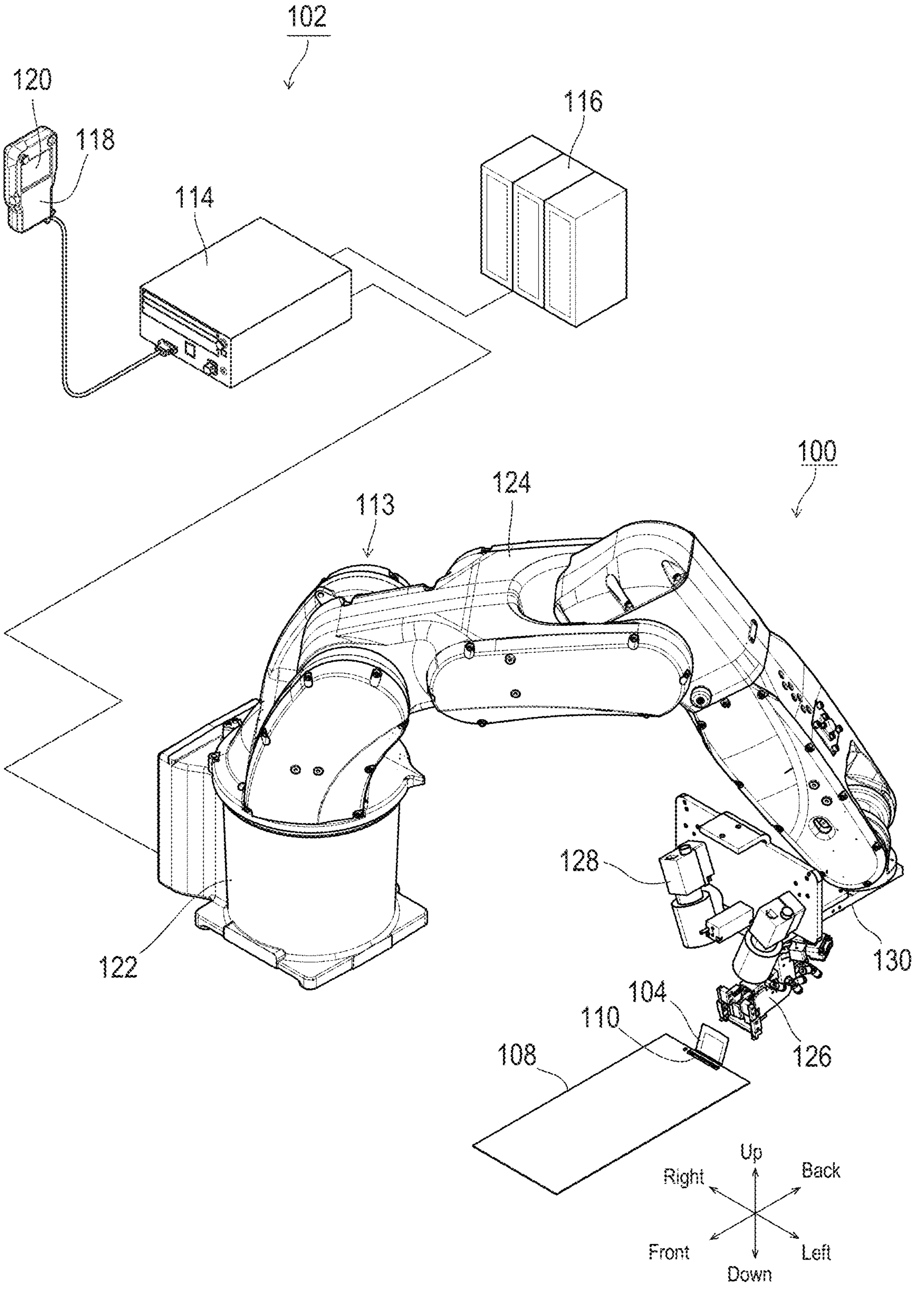
FIG. 1 is an overall configuration diagram of a robot system to which an electronic device assembly apparatus according to an embodiment of the present invention is applied.

A preferred embodiment of the present invention is described below in detail with reference to the attached drawings. Dimensions, materials, other specific numerical values, and the like described in the embodiment are merely examples for facilitating understanding of the present invention, and do not limit the present invention unless otherwise stated. In the specification and the drawings, elements that have substantially the same function and configuration are denoted by the same reference numeral, and a redundant description of such elements is omitted. Also, illustration of elements that do not directly relate to the present invention is omitted.

Figure 2:
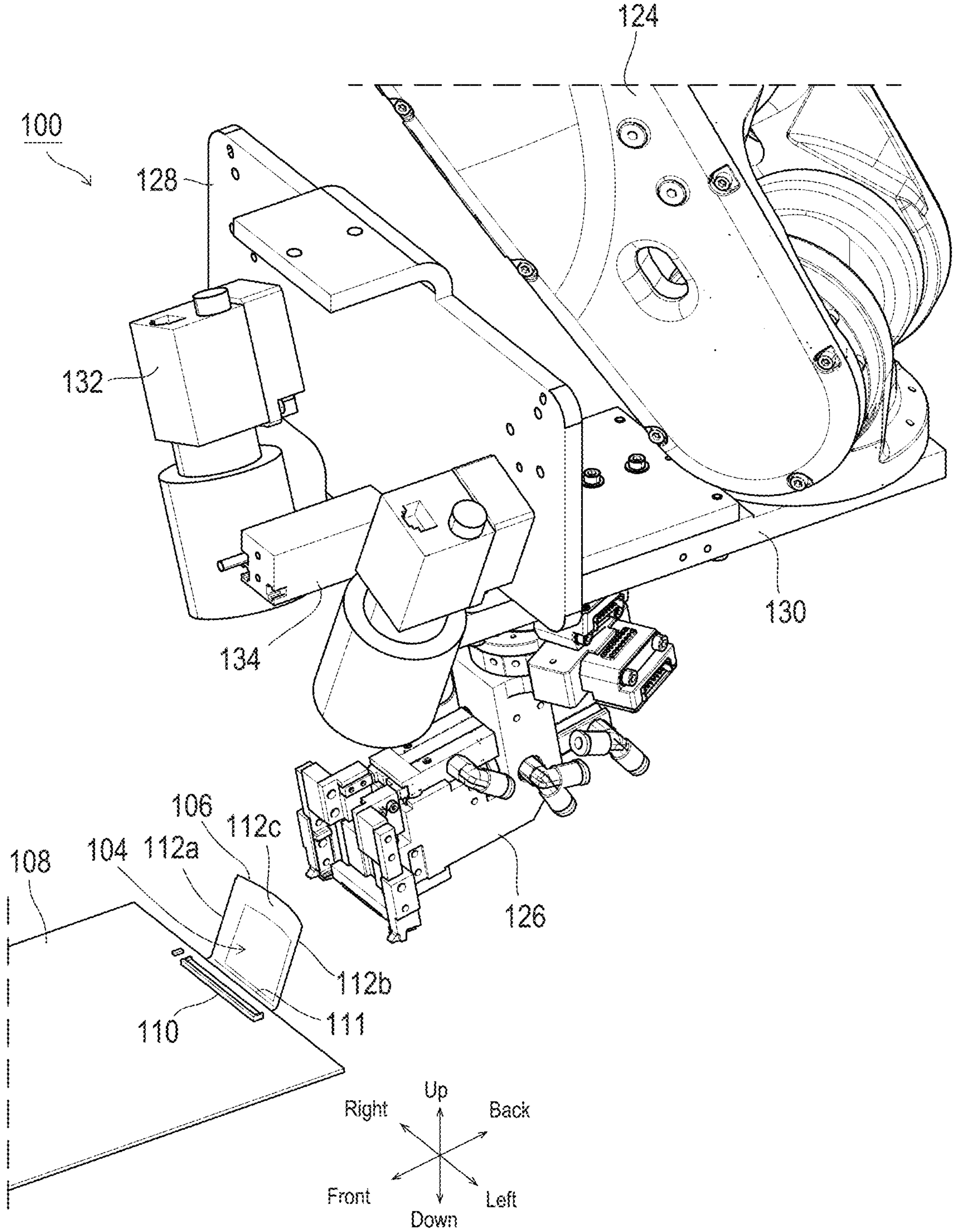
FIG. 2 is a diagram showing a part of the electronic device assembly apparatus shown in FIG. 1.

FIG. 1 is an overall configuration diagram of a robot system 102 to which an electronic device assembly apparatus 100 according to an embodiment of the present invention is applied. FIG. 2 is a diagram showing a part of the electronic device assembly apparatus 100 shown in FIG. 1. In the drawings referred to below, the front side and the back side are respectively indicated by arrows Front and Back, the left side and the right side in a width direction are respectively indicated by arrows Left and Right, and the upper side and the lower side are respectively indicated by arrows Up and Down.

The electronic device assembly apparatus 100 is an apparatus used at a production site such as a plant, for example. The electronic device assembly apparatus 100 automatically performs connection work for connecting (inserting) a leading end 106 of a cable 104 shown in FIG. 2 to a connector 110 on a circuit board 108, which is a connection target.

The cable 104 is a flat elongated cable having flexibility such as an FPC or an FFC. The cable 104 is highly flexible, and a portion of the cable 104 can be bent in an arc shape. The cable 104 includes a base 111 that is connected (soldered) to the circuit board 108, and the leading end 106 of the cable 104 is a free end.

In an actual production process performed at the production site, multiple types of cables 104 having different widths are sometimes connected to the circuit board 108. Moreover, the cable 104 may warp in such a manner that a central portion 112*c* of the cable is raised relative to side edges 112*a* and 112*b* of the cable. Therefore, in the electronic device assembly apparatus 100, a configuration is adopted that makes it possible to hold multiple types of cables 104 having different widths and correct warpage of the cables 104 while inserting leading ends 106 of the cables 104 into connectors 110 on the circuit board 108.

The electronic device assembly apparatus 100 includes a robot body 113 shown in FIG. 1 and a robot controller 114 connected to the robot body 113. The robot system 102 includes an upper-level control system 116, an input device 118, and a state notification device 120 that are connected to the robot controller 114, in addition to the electronic device assembly apparatus 100. The input device 118 is a device for inputting commands, parameters, and the like to the robot controller 114. The state notification device 120 is a device that receives and displays an operation state of the robot body 113 and a state of the connection work, which are transmitted from the robot controller 114.

The robot body 113 includes a base 122 shown in FIG. 1, a robot arm 124 connected to the base 122, a gripping device 126, and a visual device 128. The gripping device 126 is attached to a leading end 130 of the robot arm 124 as shown in FIG. 2 and grips a cable 104.

As shown in FIG. 2, the visual device 128 is an imaging device that captures images of the cable 104 and the like. The visual device 128 is attached so as to face downward toward the leading end 130 of the robot arm 124. The visual device 128 includes a camera 132, which is a visual sensor, and a lighting device 134 that lights up the circuit board 108 and the cable 104.

Figure 3:
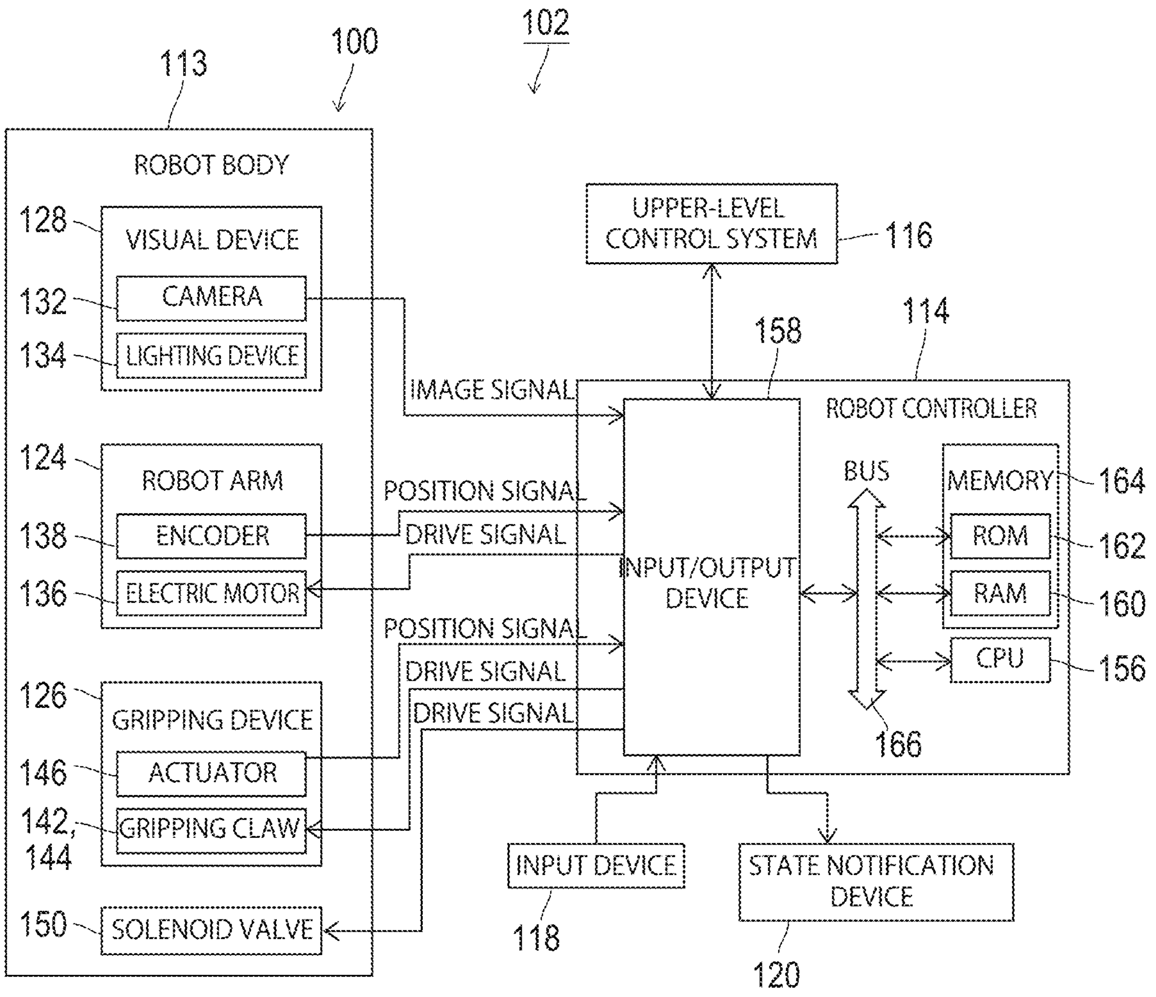
FIG. 3 is a block diagram showing functions of the robot system shown in FIG. 1.

FIG. 3 is a block diagram showing functions of the robot system 102 shown in FIG. 1. The robot arm 124 is a six-axis vertical articulated robot, and includes electric motors 136, which are actuators provided at joints of the robot arm, and encoders 138 that detect positions of the joints. The encoders 138 output position signals indicating detection results of the positions of the joints to the robot controller 114. The robot controller 114 generates drive signals for driving the electric motors 136 based on the position signals received from the encoders 138. The electric motors 136 are driven by the drive signals output from the robot controller 114 and realize target operations of the robot arm 124 in the connection work.

With this configuration, the robot arm 124 can move the gripping device 126 attached to its leading end 130 as shown in FIG. 2 to a predetermined position. Note that the robot arm 124 is not limited to a six-axis vertical articulated robot, and may also be a vertical articulated robot in which the number of axes is not six, or a horizontal articulated robot, for example.

Figure 4A:
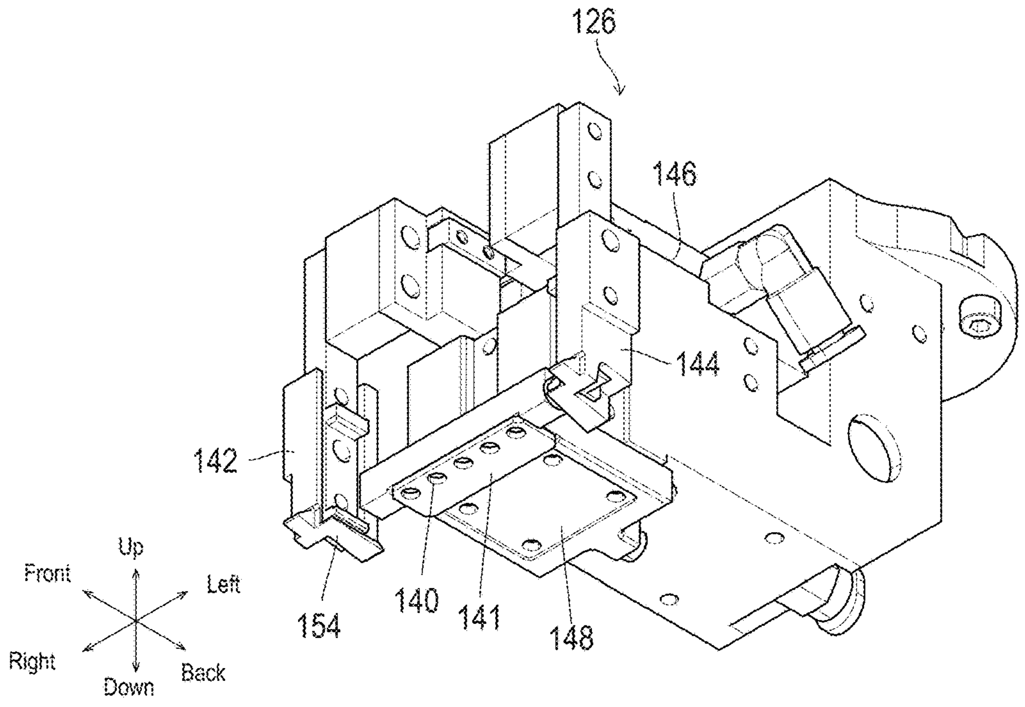
FIG. 4A is a diagram showing a gripping device as viewed from obliquely below.
Figure 4B:
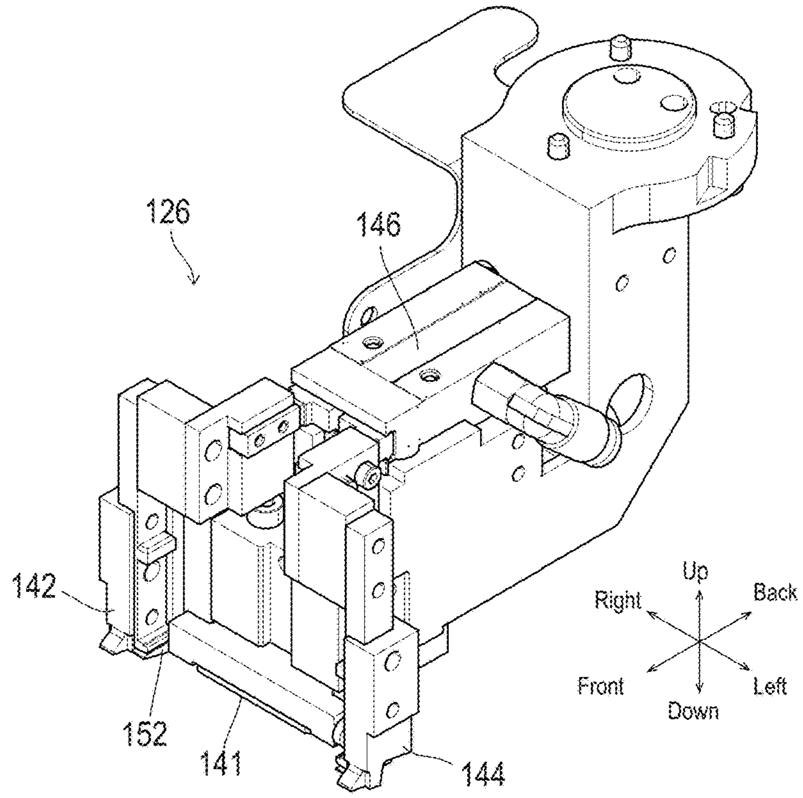
FIG. 4B is a diagram showing the gripping device as viewed from obliquely above.

FIG. 4A is a diagram showing the gripping device 126 as viewed from obliquely below. FIG. 4B is a diagram showing the gripping device 126 as viewed from obliquely above. The gripping device 126 includes: a suction device 141 including a plurality of suction holes 140; and a pair of gripping claws 142 and 144. The gripping claws 142 and 144 are located outward of the suction device 141 in the width direction and perform opening and closing operations so as to approach each other or separate from each other in response to being driven by an actuator 146, and thus hold the cable 104 by sandwiching the cable 104 in the width direction, or release the cable 104.

The suction device 141 is provided in a lower surface 148 of the gripping device 126 shown in FIG. 4A, and is, for example, a plate-shaped portion extending in the width direction. The plurality of suction holes 140 are arranged in a line along the width direction in the suction device 141. The suction device 141 holds the cable 104 by sucking a surface 112*d* (see FIG. 7) of the cable 104 via the suction holes 140. Although the suction holes 140 are arranged in a line in the illustrated example, there is no limitation to this configuration, and the suction holes 140 may also be arranged in two or more lines. Also, the suction holes 140 need not have a circular shape, and it is sufficient that they have a shape (e.g., an elliptical shape) that prevents leakage of air through gaps between the cable 104 and the suction holes 140 when the cable 104 is sucked.

The suction holes 140 are in communication with a vacuum pressure creating source such as an ejector, and a vacuum is created by feeding compressed air to the ejector through an operation of a solenoid valve 150 shown in FIG. 3. The solenoid valve 150 that controls the suction holes 140 is provided in the robot body 113 as shown in FIG. 3 and operates upon receiving a drive signal from the robot controller 114. However, there is no limitation to the configuration in which the solenoid valve 150 is provided in the robot body 113, and the solenoid valve 150 may be provided in an element included in the robot system 102.

Figure 5A:
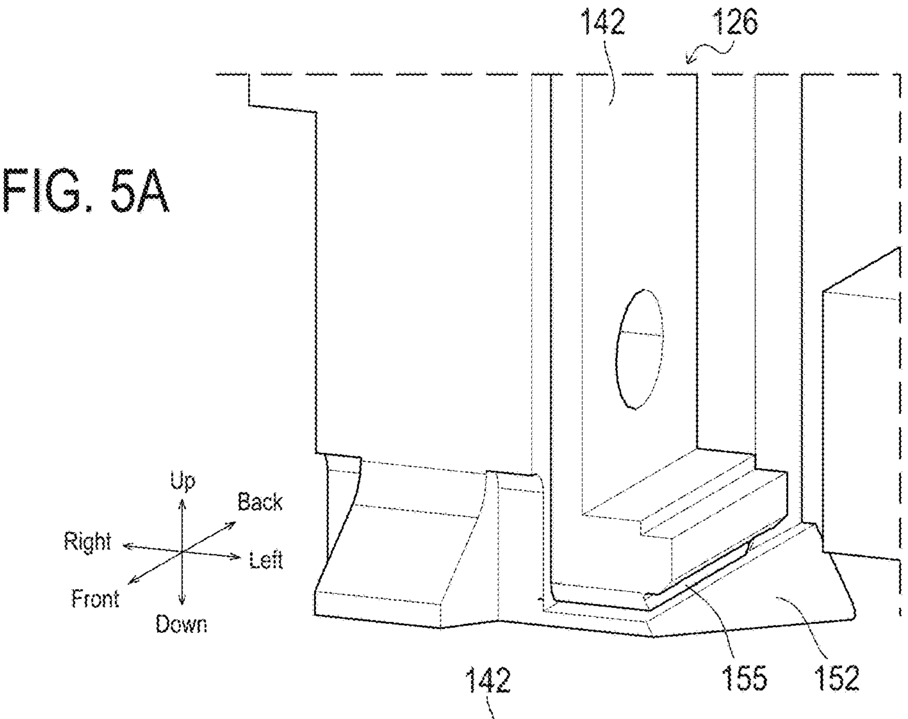
FIG. 5A is a diagram showing a gripping claw as viewed from a point that is obliquely forward of the gripping claw and on the inner side of the gripping claw in a width direction.
Figure 5B:
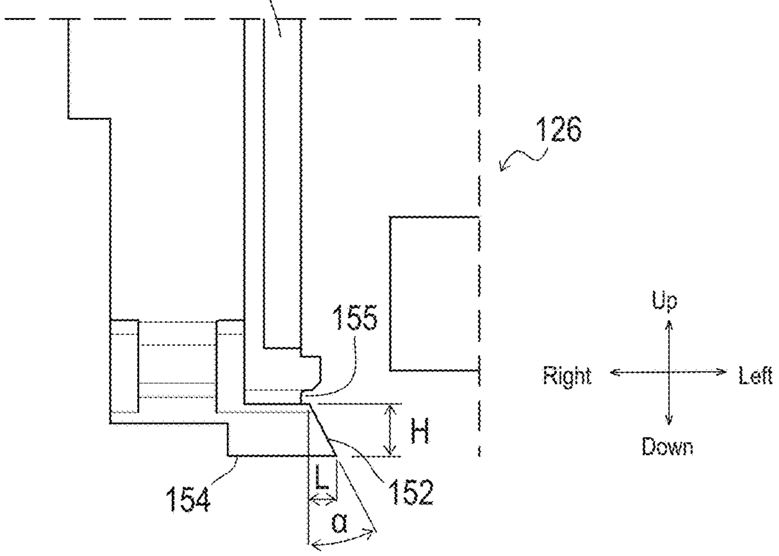
FIG. 5B is a diagram showing the gripping claw as viewed from the front.
Figure 5C:
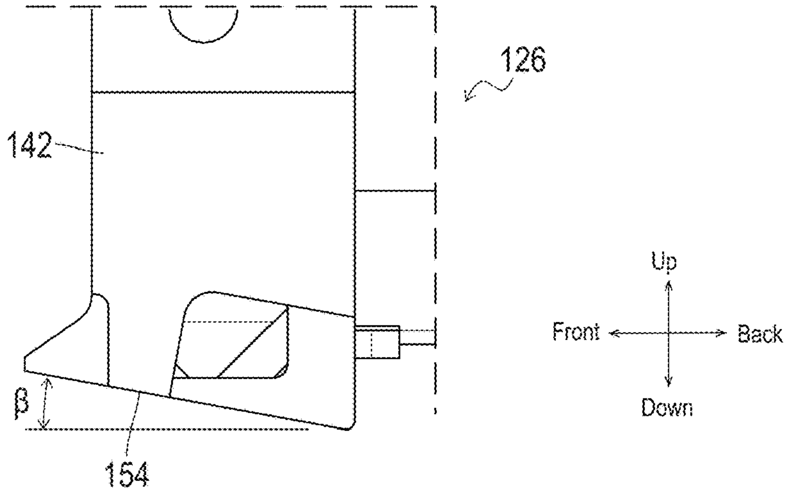
FIG. 5C is a diagram showing the gripping claw as viewed from the outer side in the width direction.

FIG. 5A is a diagram showing the gripping claw 142 as viewed from a point that is obliquely forward of the gripping claw 142 and on the inner side of the gripping claw 142 in the width direction. FIGS. 5B and 5C are diagrams showing the gripping claw 142 as viewed from the front and the outer side in the width direction, respectively. Note that the gripping claws 142 and 144 are located outward of the suction device 141 in the width direction as shown in FIG. 4, and are symmetrical to each other, and therefore, the following mainly describes the structure of the gripping claw 142.

The gripping claw 142 has a first inclined surface 152, a second inclined surface 154, and a groove 155. The first inclined surface 152 is formed on the inner side of the gripping claw 142 in the width direction as shown in FIGS. 4B and 5A. The first inclined surface 152 is inclined at a first inclination angle α (e.g., about 30°) in such a manner that a gripping width increases upward as shown in FIG. 5B.

The second inclined surface 154 is formed at the bottom of the gripping claw 142 as shown in FIGS. 4A and 5B. The second inclined surface 154 is inclined upward to the front at a second inclination angle β (e.g., about 10°) in a state where the gripping claw 142 is at a horizontal position as shown in FIG. 5C.

Figure 7A:
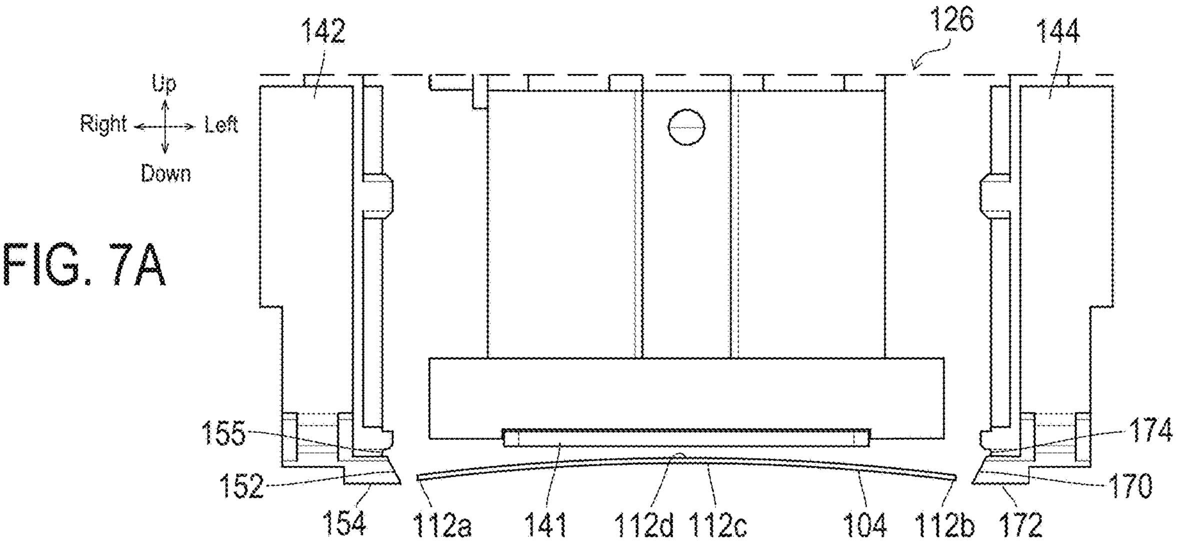
FIG. 7A is a diagram showing shapes of gripping claws and the cable and a positional relationship between the gripping claws and the cable.
Figure 7B:
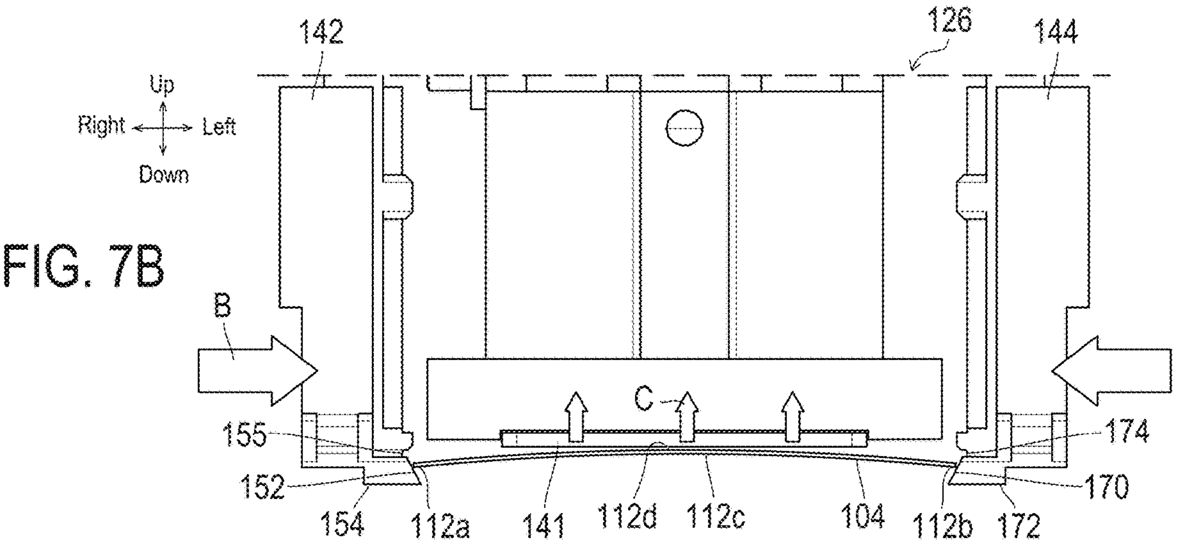
FIG. 7B shows a state where the cable is sandwiched in the width direction.
Figure 7C:
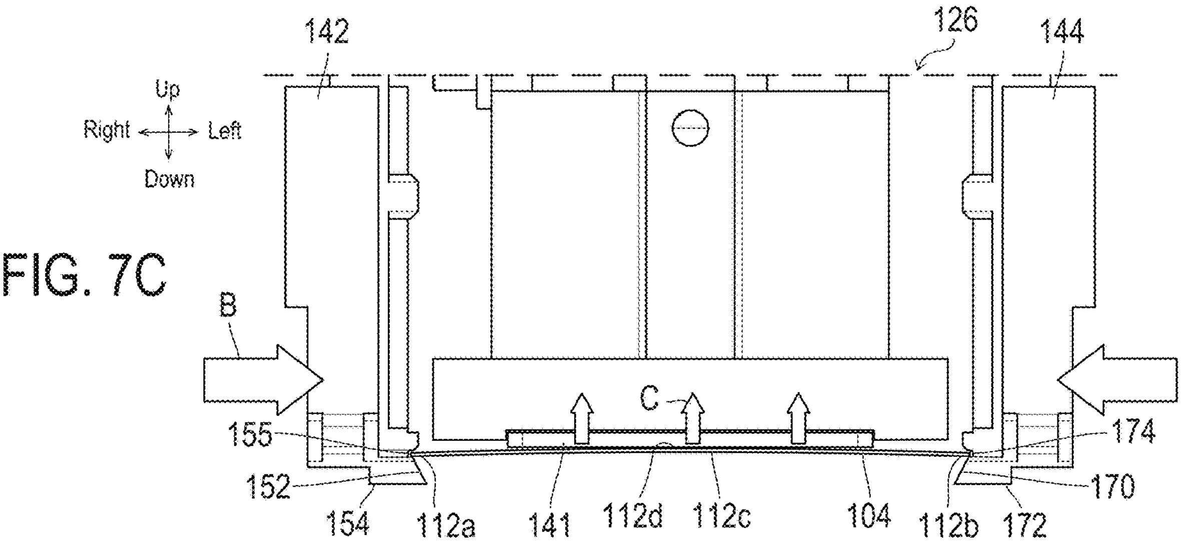
FIG. 7C shows a state where the cable is sucked.

As shown in FIGS. 5A and 5B, the groove 155 is formed on the upper side of the first inclined surface 152 and recessed outward in the width direction so that a side edge 112*a* of the cable 104 fits in the groove 155 (see FIG. 7C).

Here, the elements shown in FIG. 3 will be described in detail. The camera 132 and the lighting device 134 included in the visual device 128 are attached to the leading end 130 of the robot arm 124 (see FIG. 1), but there is no limitation to this configuration, and the camera and the lighting device may be provided at a position other than the robot body 113 so long as an overhead image of a work area of the connection work can be obtained. At least one camera 132 needs to be provided, and it is preferable to provide two or more cameras in order to enhance imaging precision. The camera 132 may obtain color images or monochrome images.

In the case where the camera 132 is a monocular camera, three-dimensional imaging information can be estimated with use of known SLAM (Simultaneous Localization and Mapping) technology. However, in this case, the camera 132 needs to be moved while taking images. Note that, in principle, the camera 132 can obtain only a relative value of distance, but when positional information of the camera 132 can be obtained from the robot controller 114, it is possible to obtain positional information in a robot coordinate system.

In the case where the camera 132 is a stereo camera, positional information can be obtained from parallax information obtained through known stereo matching. In the case where the camera 132 is a multi-view camera, the principle is the same as that of the stereo camera, and parallax images taken from various directions can be obtained, and therefore, occlusion is unlikely to occur. In the case where the camera 132 is a TOF (Time of Flight) camera, positional information can be obtained based on the time it takes to receive light reflected from a subject after the light is emitted toward the subject. In the case where the camera 132 uses emitted light, positional information can be obtained by performing known pattern projection (projection of a stripe pattern or a random dot pattern).

The lighting device 134 is installed in a surrounding region of a lens of the camera 132 for capturing images, for example, and lights up the cable 104 to be gripped by the gripping device 126 and the connector 110 on the circuit board 108 to which the cable is to be connected. However, there is no limitation to this configuration, and the lighting device may also emit pattern light when measuring a distance.

As shown in FIG. 3, the robot controller 114 includes a CPU 156, an input/output device 158 for inputting and outputting signals, and a memory 164 including a RAM 160 and a ROM 162. The CPU 156, the input/output device 158, and the memory 164 are connected to each other via a bus 166 in such a manner that signals can be transmitted therebetween.

The CPU 156 functions as an arithmetic processing device, accesses the memory 164, and reads out and executes various programs stored in the RAM 160, the ROM 162, an external storage device, or the like. The RAM 160 and the ROM 162 are computer-readable recording mediums including programs recorded thereon for controlling the robot body 113, i.e., executing an electronic device assembly method. For example, a program and a device constant used by the CPU 156 are stored in the ROM 162. For example, a program used by the CPU 156 and a variable that varies successively during execution of the program are temporarily stored in the RAM 160. As described above, the robot controller 114 can control the robot body 113 and the gripping device 126 by executing various programs and cause the robot body 113 and the gripping device 126 to execute various functions.

The input/output device 158 of the robot controller 114 includes a communication device, a D/A converter, a motor drive circuit, an A/D converter, and the like, and connects the robot controller 114 to an external device, the electric motors 136, the actuator 146, and various sensors such as the encoders 138 via an interface. Examples of specific communication methods used by the communication device may include data communication in accordance with serial communication standards such as RS232C/485 or USB standards, EtherNET (registered trademark), which is a common network protocol, and EtherCAT (registered trademark) and EtherNet/IP (registered trademark), which are used as industrial network protocols.

The robot controller 114 may also be connected via the input/output device 158 to a storage device for storing data or a drive device that is a reader-writer for recording mediums. The robot controller 114 is not limited to a controller in which dedicated hardware is incorporated, and may also be a general-purpose personal computer that can execute various functions when various programs are installed, for example.

Note that the robot controller 114 controls all of the robot arm 124, the gripping device 126, and the visual device 128, but there is no limitation to this configuration. For example, the robot controller 114 may be configured as a group of a plurality of controller s that respectively control the robot arm 124, the gripping device 126, and the visual device 128, and the plurality of controller s may be connected to each other wirelessly or by cable. Furthermore, the robot controller 114 is provided outside the robot body 113 in the electronic device assembly apparatus 100, but there is no limitation to this configuration, and the robot controller 114 may also be provided inside the robot body 113.

The input device 118 includes an operation means to be operated by a user, such as a keyboard, a mouse, a touch panel, a button, a switch, a lever, a pedal, a remote control means that uses infrared rays or other radio waves, or a personal computer or teaching pendant including these devices. The user who performs the connection work uses the input device 118 to perform input and setting. Note that a program that causes the robot body 113 to execute various functions may be created with use of the input device 118.

The program may be written in a low level language such as a machine language or a high level language such as a robot language.

The state notification device 120 receives information regarding an operation state of the robot body 113 and information regarding a state of the leading end 106 of the cable 104 inserted into the connector 110 on the circuit board 108 from the robot controller 114 and displays the information to enable the user to recognize the information visually and intuitively. The state notification device 120 may be a display device such as a liquid crystal panel, a teaching pendant, or a lighting lamp, or a notification device that gives notifications regarding information with use of an alert sound or audio. For example, the state notification device 120 may be set so as to issue an alert when the connection work for inserting the leading end 106 of the cable 104 into the connector 110 has failed. Alternatively, a screen of a personal computer or a teaching pendant may serve as the state notification device 120. The state notification device 120 may include an application for performing input and notification of states.

The upper-level control system 116 is constituted by, for example, a sequencer (PLC), a monitoring and control system (SCADA), a process computer (PROCOM), a personal computer, various servers, or a combination thereof, and connected to the robot controller 114 wirelessly or by cable. The upper-level control system 116 outputs instructions based on operation states of devices that constitute a production line including the robot controller 114, and comprehensively controls the production line.

The upper-level control system 116 can also be used to monitor a defect rate or a cycle time or inspect products by receiving and collecting the time it takes to complete the connection work, a state after the connection work is complete, or the like from the robot controller 114. Furthermore, the upper-level control system 116 may obtain information regarding a state of the operation for gripping the cable 104 with the gripping device 126 of the robot body 113 from the robot controller 114 to cause the robot arm 124 to return to a home position or stop each device.

Figure 6A:
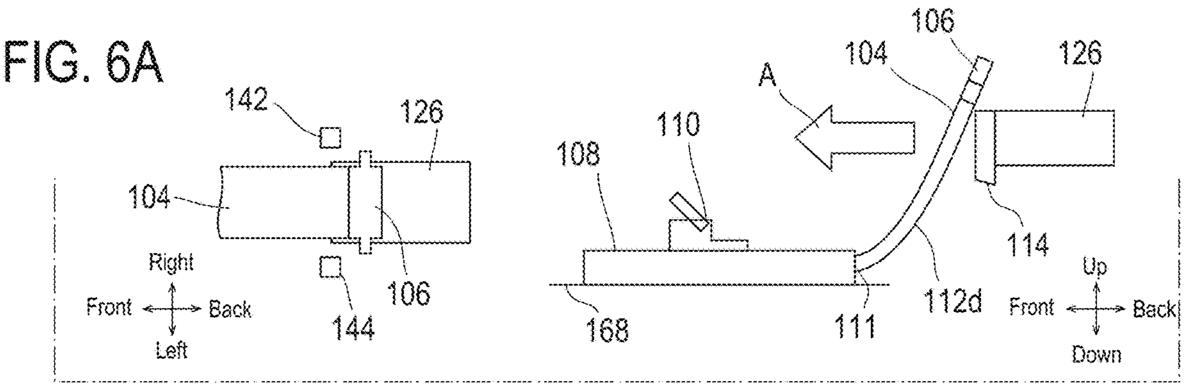
FIG. 6A shows a state where the gripping device is pressed against a surface of a cable.
Figure 6B:
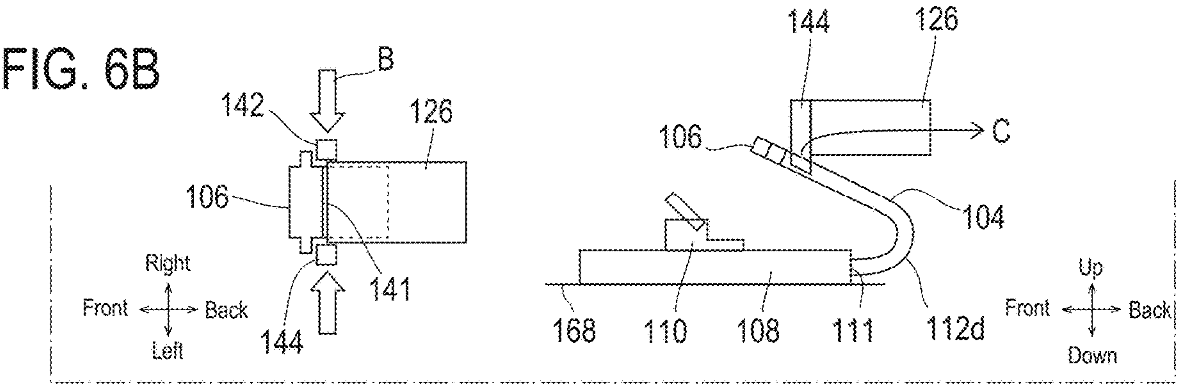
FIG. 6B shows a state where the cable is sandwiched in the width direction and sucked.
Figure 6C:
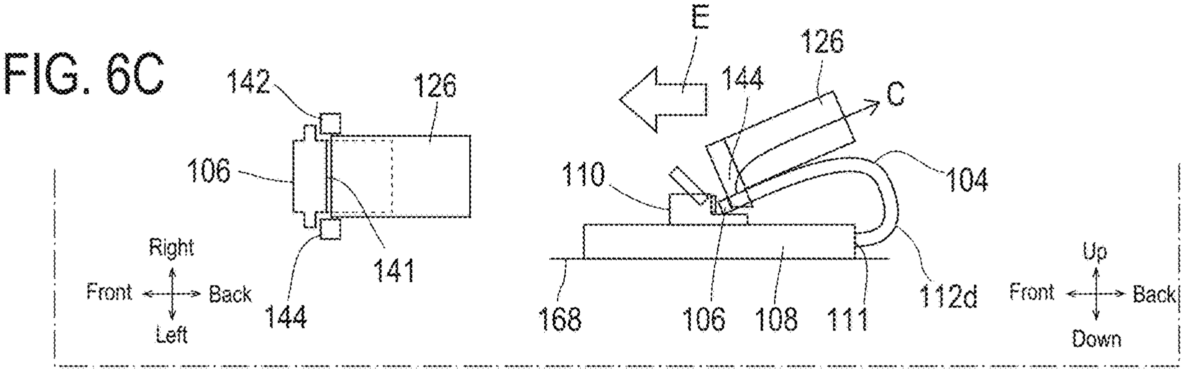
FIG. 6C shows a state where the cable is connected.

Next, operations performed by the electronic device assembly apparatus 100 will be described. FIGS. 6A to 6C are diagrams showing connection work for connecting the cable 104 with use of the gripping device 126. In each of FIGS. 6A to 6C, a side view of the gripping device 126 and the cable 104 is shown on the right, and a top view of the gripping device 126 and the cable 104 is shown on the left.

First, in the electronic device assembly apparatus 100, after the circuit board 108 is placed on a table 168 shown in FIG. 6A, the CPU 156 shown in FIG. 3 recognizes the position and type of cable 104 based on an image signal obtained from the visual device 128 of the robot body 113. As long as an image signal can be generated, there is no limitation to the configuration in which the visual device 128 is used, and an image of the cable 104 may be obtained with use of a fixed camera installed at a position from which the work area can be viewed from above.

Next, the CPU 156 outputs a drive signal to the robot arm 124 based on the recognition result of the position and type of the cable 104 to cause the robot arm 124 to operate and move the gripping device 126. Thus, the robot arm 124 can move the gripping device 126 relative to the circuit board 108. The CPU 156 moves the gripping device 126 as shown by the arrow A in FIG. 6A to press the gripping device 126 against the surface 112*d* of the cable 104.

The CPU 156 further outputs a drive signal to cause the robot arm 124 to operate and advance the gripping device 126 toward the circuit board 108. Thus, the gripping device 126 is slid along the surface 112*d* of the cable 104 and the cable 104 is bent by the gripping device 126. Subsequently, the CPU 156 performs connection work for connecting the cable 104 shown in FIG. 6B.

FIGS. 7A to 7C are diagrams showing the connection work for connecting the cable 104 shown in FIG. 6B. As shown in FIG. 7A, the structure of the gripping claw 144 is symmetrical to the structure of the gripping claw 142, and the gripping claw 144 has a first inclined surface 170, a second inclined surface 172, and a groove 174.

The cable 104 has warped in such a manner that the central portion 112*c* is raised relative to the side edges 112*a* and 122*b*. The surface 112*d* of the cable 104 is located under the suction device 141 of the gripping device 126 as shown in FIGS. 6B and 7A. The gripping claws 142 and 144 are located outward of the suction device 141 in the width direction, and the first inclined surfaces 152 and 170 of the gripping claws 142 and 144 are inclined in such a manner that the gripping width increases upward.

The CPU 156 outputs a drive signal to cause the robot arm 124 to operate and sandwich the cable 104 in the width direction with use of the gripping claws 142 and 144 as shown by the arrows B in FIGS. 6B and 7B. As a result, the side edges 112*a* and 112*b* of the cable 104 move upward along the first inclined surfaces 152 and 170 of the gripping claws 142 and 144 and deform in a state where the surface 112 of the cable 104 is pressed against the suction device 141. Thus, the gripping device 126 can correct warpage of the cable 104 while holding the cable 104.

Thereafter, the CPU 156 controls the solenoid valve 150 (see FIG. 3) to suck air via the suction holes 140 of the suction device 141 as shown by the arrows C in FIGS. 6B and 7B, and thus, for example, the central portion 112*c* and a surrounding region of the central portion 112*c* in the surface 112*d* of the cable 104 can be sucked.

As described above, the gripping device 126 can hold the cable 104 by sucking the surface 112*d* of the cable 104 with use of the suction device 141 and sandwiching the cable 104 in the width direction with use of the gripping claws 142 and 144 located outward of the suction device 141 in the width direction. Therefore, the gripping device 126 can hold multiple types of cables 104 having different widths.

Subsequently, the CPU 156 further causes the gripping claws 142 and 144 to sandwich the cable 104 in the width direction as shown by the arrows B in FIG. 7C. As a result, the side edges 112*a* and 112*b* of the cable 104 further move upward along the first inclined surfaces 152 and 170 of the gripping claws 142 and 144 while deforming in the state where the surface 112*d* of the cable 104 is pressed against the suction device 141 and sucked by the suction device 141, and the side edges 112*a* and 112*b* fit in the grooves 155 and 174 on the upper side of the first inclined surfaces 152 and 170. Thus, the gripping device 126 can reliably hold the cable 104 in a state where warpage of the cable 104 is further corrected.

The height of the first inclined surface 152 of the gripping claw 142 is shown as a length H in FIG. 5B. Also, a length L shown in FIG. 5B is set in accordance with a stroke of the actuator 146 that moves the gripping claws 142 and 144 in the width direction. The first inclination angle $\alpha$ of the first inclined surface 152 is defined by these lengths H and L. Accordingly, when the cable 104 is sandwiched by the gripping claws 142 and 144 in the width direction, the side edges 112*a* and 112*b* of the cable 104 deform while moving upward by the length H at the maximum along the first inclined surfaces 152 and 170 of the gripping claws 142 and 144. Also, at this time, the gripping claws 142 and 144 move inward in the width direction by the length L at the maximum. Therefore, the larger the length H corresponding to the height of the first inclined surfaces 152 and 170 of the gripping claws 142 and 144 is, the more reliably warpage of the cable 104 can be corrected.

Figure 8A:
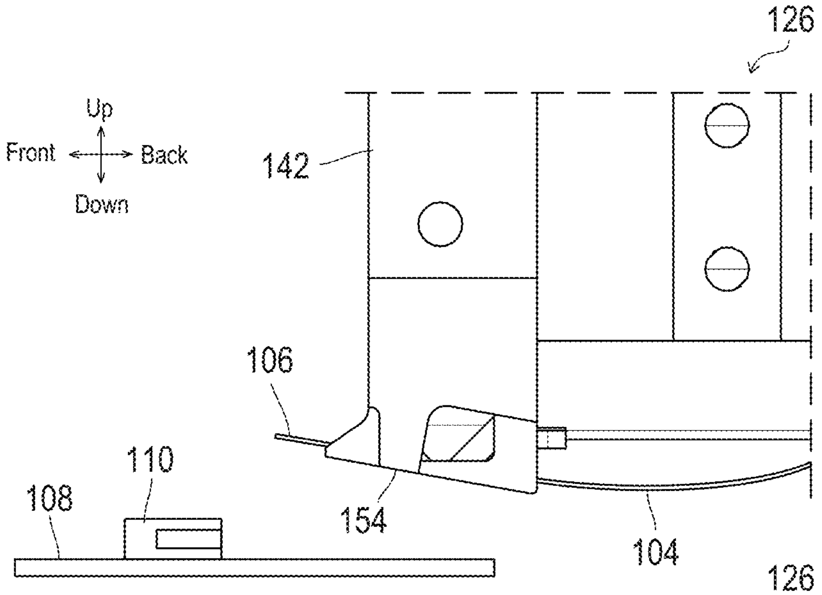
FIG. 8A is a diagram showing a gripping claw 142 shown in FIG. 7C as viewed from the outer side in the width direction.
Figure 8B:
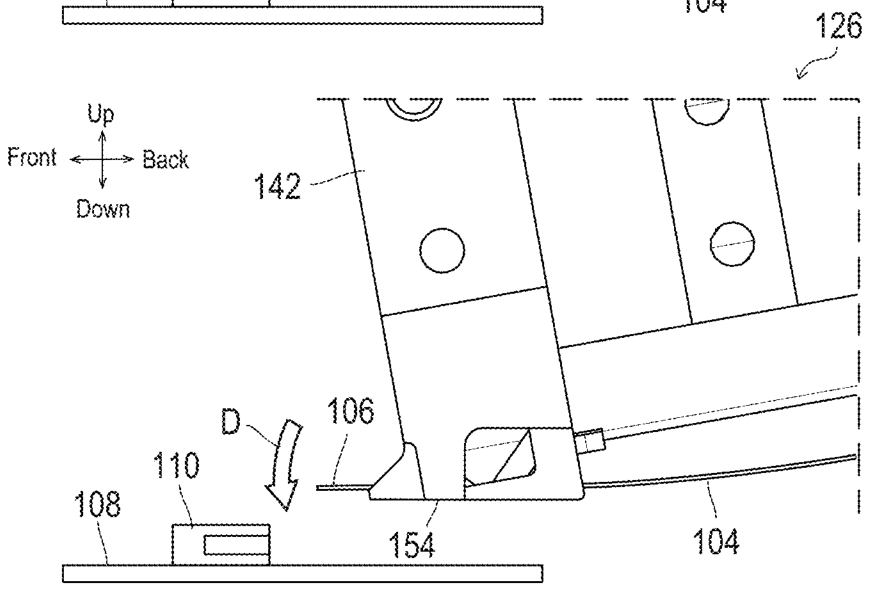
FIG. 8B shows a state where the gripping device is inclined.
Figure 8C:
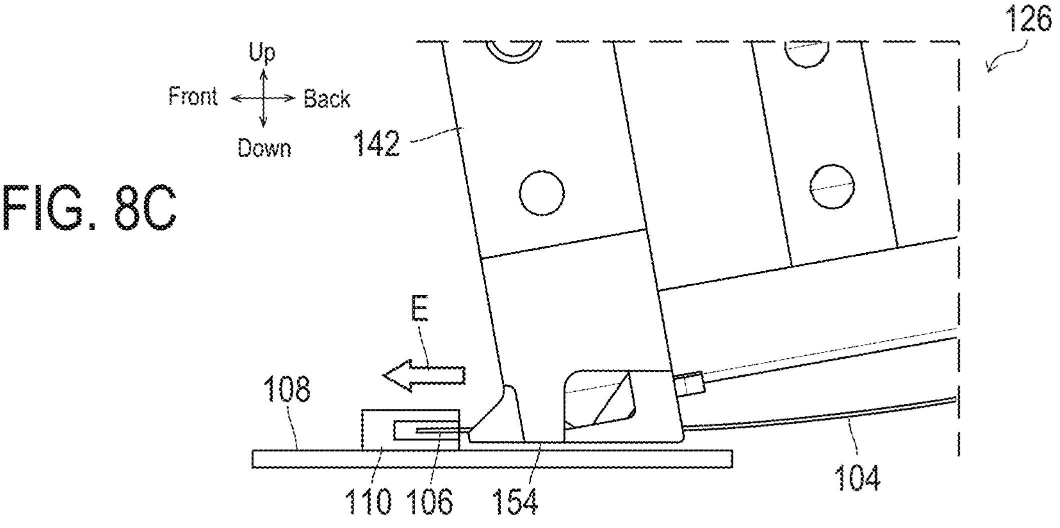
FIG. 8C shows a state where a leading end of the cable is inserted into a connector.

Subsequently, connection work for connecting the cable 104 shown in FIG. 6C is performed. FIGS. 8A to 8C are diagrams showing the connection work for connecting the cable 104 shown in FIG. 6C. FIG. 8A shows the gripping claw 142 of the gripping device 126 shown in FIG. 7C, as viewed from the outer side in the width direction.

The second inclined surface 154 is formed at the bottom of the gripping claw 142 in such a manner as to be inclined upward to the front when the gripping claw 142 is at a horizontal position as shown in FIG. 8A. Also, the second inclined surface 172 is formed at the bottom of the gripping claw 144 in such a manner as to be inclined upward to the front when the gripping claw 144 shown in FIG. 7 is at a horizontal position.

In the state where the robot arm 124 has been caused to operate by a drive signal output from the CPU 156 and the cable 104 is held sandwiched between the gripping claws 142 and 144 in the width direction, the CPU 156 controls the robot arm 124 to incline the gripping device 126 by the second inclination angle β shown in FIG. 5C, for example, as shown by the arrow D in FIG. 8B. As a result, the bottoms of the gripping claws 142 and 144 extend parallel to the circuit board 108, and therefore, it is possible to avoid a situation in which the second inclined surfaces 154 at the bottoms of the gripping claws 142 and 144 interfere with the circuit board 108 to which the cable is to be connected.

Subsequently, the CPU 156 aligns the leading end 106 of the cable 104 with the connector 110. This alignment needs to be performed while giving consideration to variation in the positions of the connector and the leading end of the cable relative to each other due to a positional error made in the operation of gripping the cable 104 with the gripping device 126, an installation error made when the circuit board 108 is placed on the table 168, a positional error made when the connector 110 is mounted on the circuit board 108, or the like.

Therefore, the CPU 156 generates position correction data based on an image signal obtained from the visual device 128 of the robot body 113, and thus, the electronic device assembly apparatus 100 absorbs variation in the positions of the connector and the leading end of the cable relative to each other. The CPU 156 can correct a positional error and a posture error by moving the gripping device 126 based on the position correction data. For example, the CPU 156 extracts feature points of the cable 104 and the connector 110, calculates a position correction amount that realizes an appropriate positional relationship between the feature points, and moves the gripping device 126 and the cable 104.

After alignment between the connector 110 and the leading end 106 of the cable 104 is completed, the CPU 156 inserts the leading end 106 of the cable 104 into the connector 110 by moving the gripping device 126 as shown by the arrow E in FIG. 8C. Note that the above-described correction of positions can be omitted as appropriate depending on conditions such as positional accuracy of the cable 104 and the connector 110.

Next, an image of the connector 110 and the cable 104 inserted into the connector 110 is captured by the visual device 128, and the CPU 156 compares the image with an image of a case where insertion is successful. When it is determined through the comparison that the insertion is successful, i.e., the connection work is complete, the CPU 156 ends the processing.

On the other hand, when it is determined that the insertion has failed, the CPU 156 may notify the upper-level control system 116 or the user of the occurrence of an abnormality via the state notification device 120 shown in FIG. 3. Also, some measures may be taken such as retrying the connection work. It is also possible to omit automatic determination by the robot system 102 and inspect the circuit board 108 in another step after the insertion is complete.

With use of the robot system 102 to which the electronic device assembly apparatus 100 is applied as described above, it is possible to hold multiple types of cables 104 having different widths and correct warpage of the cables 104 while reliably performing connection work for connecting the multiple types of cables 104.

In the above embodiment, a case is described as an example in which the cable 104 warps in such a manner that the central portion 112*c* of the cable 104 is raised relative to the side edges 112*a* and 122*b* of the cable 104, but there is no limitation to such a case. That is, the electronic device assembly apparatus 100 can also be applied to a case where the cable 104 warps in the opposite direction in such a manner that the central portion 112*c* is depressed relative to the side edges 112*a* and 122*b*.

In this case, the gripping device 126 can guide the side edges 112*a* and 112*b* of the cable 104 to the grooves 155 and 174 and fit the side edges 112*a* and 112*b* in the grooves 155 and 174 by sandwiching the cable 104 in the width direction with use of the gripping claws 142 and 144 to move the side edges 112*a* and 112*b* of the cable 104 upward along the first inclined surfaces 152 and 170 and by pressing the side edges 112*a* and 112*b* against, for example, inclined upper surfaces of the grooves 155 and 174, which are recessed outward in the width direction. Thus, the gripping device 126 can reliably hold the cable 104 in a state where warpage of the cable 104 in the opposite direction is corrected.

In the above embodiment, a case is described as an example in which the base 111 of the cable 104 is electrically connected to the circuit board 108, but there is no limitation to such a case. That is, the electronic device assembly apparatus 100 can also be applied to a case where the base 111 of the cable 104 is not electrically connected to the circuit board 108. In this case, connection work can be performed without the cable 104 being bent by the gripping device 126.

While a preferred embodiment of the present invention has been described with reference to the attached drawings, it goes without saying that the present invention is not limited to the embodiment. It is clear that those skilled in the art will be able to arrive at various changes and modifications within the scope of the claims, and those changes and modifications are understood to naturally fall within the technical scope of the present invention.

This application is based upon and claims the benefit of priority from the prior Japanese Patent Application No. 2021-125234, filed on Jul. 30, 2021, the above contents are cited in the specification, claims, and drawings of the present application.

INDUSTRIAL APPLICABILITY

The present invention can be used as an electronic device assembly apparatus and an electronic device assembly method for gripping a cable connected to a circuit board of an electronic device or the like.

INDEX TO THE REFERENCE NUMERALS

100 . . . electronic device assembly apparatus; 102 . . . robot system; 104 . . . cable; 106 . . . leading end of cable; 108 . . . circuit board; 110 . . . connector; 111 . . . base of cable; 112*a*, 122*b* . . . side edges of cable; 112*c* . . . central portion of cable; 112*d* . . . surface of cable; 113 . . . robot body; 114 . . . robot controller; 116 . . . upper-level control system; 118 . . . input device; 120 . . . state notification device; 122 . . . base; 124 . . . robot arm; 126 . . . gripping device; 128 . . . visual device; 130 . . . leading end of robot arm; 132 . . . camera; 134 . . . lighting device; 136 . . . electric motor; 138 . . . encoder; 140 . . . suction hole; 141 . . . suction device; 142, 144 . . . gripping claw; 146 . . . actuator; 148 . . . lower surface of gripping device; 150 . . . solenoid valve; 152, 170 . . . first inclined surface; 154, 172 . . . second inclined surface; 155, 174 . . . groove; 156 . . . CPU; 158 . . . input/output device; 160 . . . RAM; 162 . . . ROM; 164 . . . memory; 166 . . . bus; 168 . . . table

The invention claimed is:

1. An electronic device assembly apparatus comprising:

a gripping device that grips a flexible flat cable including a leading end that is a free end;

a robot arm that moves the gripping device relative to a circuit board to which the leading end of the cable is to be connected; and a robot control device that controls operations of the gripping device and the robot arm, wherein the gripping device includes:

a suction device that is provided in a lower surface of the gripping device and holds the cable by sucking a surface of the cable; and gripping claws that are located outward of the suction device in a width direction and hold the cable by sandwiching the cable in the width direction, first inclined surfaces are formed on inner sides of the gripping claws in the width direction, the first inclined surfaces being inclined in such a manner that a gripping width increases upward from bottoms of the gripping claws, and second inclined surfaces are formed at the bottoms of the gripping claws, the second inclined surfaces being inclined upward to the front in a state where the gripping claws are at horizontal positions.

2. The electronic device assembly apparatus according to claim 1, wherein grooves in which side edges of the cable fit are formed on upper sides of the first inclined surfaces in the gripping device.

3. An electronic device assembly method for inserting a leading end of a flexible flat cable into a connector on a circuit board, the leading end being a free end, the method comprising:

moving a gripping device that includes: a suction device that is provided in a lower surface of the gripping device and holds the cable by sucking a surface of the cable; and gripping claws that are located outward of the suction device in a width direction and hold the cable by sandwiching the cable in the width direction, wherein first inclined surfaces are formed on inner sides of the gripping claws in the width direction, the first inclined surfaces being inclined in such a manner that a gripping width increases upward from bottoms of the gripping claws, second inclined surfaces are formed at the bottoms of the gripping claws, the second inclined surfaces being inclined upward to the front in a state where the gripping claws are at horizontal positions, side edges of the cable are moved upward along the first inclined surfaces by sandwiching the cable in the width direction with use of the gripping claws while sucking the surface of the cable with use of the suction device to hold the cable, and the gripping device is inclined in such a manner that the bottoms of the gripping claws provided with the second inclined surfaces extend substantially parallel to the circuit board, and the gripping device is further moved to insert the leading end of the cable into the connector on the circuit board.

* * * * *